United States Patent [19]

Bhatt et al.

[11] Patent Number: 4,636,967
[45] Date of Patent: Jan. 13, 1987

[54] MONITOR CIRCUIT

[75] Inventors: Devesh Bhatt, Shoreview; Michael O. Schroeder, St. Anthony, both of Minn.

[73] Assignee: Honeywell Inc., Minneapolis, Minn.

[21] Appl. No.: 545,312

[22] Filed: Oct. 24, 1983

[51] Int. Cl.[4] ............... G06M 1/28; G06M 3/02; G07C 3/10
[52] U.S. Cl. ................... 364/550; 364/552; 377/15; 377/31; 377/39
[58] Field of Search ............ 364/550, 551, 552, 559, 364/560; 377/8, 13, 15, 16, 20, 31, 39, 51, 107

[56] References Cited

U.S. PATENT DOCUMENTS

| | | | |
|---|---|---|---|
| 3,586,982 | 6/1971 | Hoyler | 377/107 |
| 3,906,454 | 9/1975 | Martin | 364/200 |
| 3,911,402 | 10/1975 | McLean et al. | 364/200 |
| 3,946,210 | 3/1976 | Fleischer | 377/107 |
| 3,962,565 | 6/1976 | Guyen-Phuoc | 377/51 X |
| 4,008,404 | 2/1977 | Foreman | 307/149 |
| 4,048,481 | 9/1977 | Bailey, Jr. et al. | 371/16 |
| 4,142,238 | 2/1979 | Brandt et al. | 364/552 |
| 4,176,781 | 10/1979 | Huesing et al. | 371/16 |
| 4,195,258 | 3/1980 | Yen | 324/73 AT |
| 4,213,178 | 7/1980 | Diez et al. | 364/200 |
| 4,219,875 | 8/1980 | Templeton | 364/200 |
| 4,241,416 | 10/1980 | Tarczy-Hornoch | 364/900 |
| 4,283,769 | 8/1981 | Asada | 364/569 X |
| 4,315,313 | 2/1982 | Armstrong et al. | 364/200 |
| 4,334,308 | 6/1982 | Thinschmidt et al. | 371/29 |
| 4,364,036 | 12/1982 | Shimizu | 340/715 |
| 4,367,525 | 1/1983 | Brown | 364/200 |
| 4,382,179 | 5/1983 | Penton | 377/20 |
| 4,414,633 | 11/1983 | Churchill | 364/551 X |

OTHER PUBLICATIONS

Stephens: Programmable Event Timer, IBM Technical Disclosure Bulletin, vol. 22, No. 2, Jul. 1979, pp. 785/786.

Primary Examiner—Felix D. Gruber
Attorney, Agent, or Firm—William T. Udseth

[57] ABSTRACT

A circuit for monitoring digital electrical signals which counts events, compares the event count to a threshold value, generates an equal value signal when the threshold is attained and indicates the time elapsed between an initial value and the generation of the equal value signal. The event counter is automatically cleared or reset upon a user enabled automatic clear logic enabling signal. The circuit is preferably configured as a chip employing GaAs Schottky diode field effect transistor logic (SDFL) gates.

4 Claims, 5 Drawing Figures

MONITOR CIRCUIT

BACKGROUND OF THE INVENTION

1. Field of the Invention

This invention relates to circuits for counting user defined events occurring within a digital electronic circuit or device, and for recording the time at which the count reaches a user defined threshold.

2. Prior Art

Electrical circuits for performing a count and compare function on a digital electrical circuit are known, as are digital circuits for generating timing signals. D. S. Foreman in U.S. Pat. No. 4,008,404 discloses a digital interval timer which counts seconds and compares the value to a user defined threshold value.

Logic analyzers are complex diagnostic circuits utilized to determine the state of various registers and operations within digital computers. They are relatively large devices designed specifically to monitor computers. Typically they compare bit patterns in a first register with bit patterns in a second register and generate a trigger signal when a match occurs. Some logic analyzers operate in a further mode wherein the timing of computer control signals is monitored. Logic analyzers are used to debug computers by noting timing "gliches" and erroneous bit patterns. Traczy-Hornach in U.S. Pat. No. 4,241,416 discloses a logic analyzer particularly adapted to monitor microprocessors.

A further form of logic analyzer is the composite logic analyzer. A composite logic analyzer displays timing and state data simultaneous. Shimizu in U.S. Pat. No. 4,364,036 discloses a composite logic analyzer wherein the timing relationship between the timing and state data is correlated on a signal display.

Heretofore, however, a device has not been disclosed which is easily integrable, functions at high speed, is capable of continuously monitoring digital electrical circuits by counting virtually any user defined event and can time the period between two such events.

SUMMARY OF THE INVENTION

The invention is a device for monitoring a monitored device which can be adapted to effect a digital electrical signal, wherein the occurrence of a selected event generates an event digital signal and wherein a control device generates a digital clock signal, comprising: first means for counting the event digital signals so that the current value held within the first counting means is an event count, means for holding a threshold value, means for comparing the threshold value to the event count and for generating an equal value digital signal when the event count equals the threshold value, second means for counting the digital clock signals so that the current value within the second counting means is a timing signal, means for initializing the second counting means to an initial value when the first counting means is at a reference value, means for recording the timing signal in response to a record signal and means for enabling the resetting of the event count to the reference value upon the occurrence of the record signal.

DESCRIPTION OF THE PREFERRED EMBODIMENT

Figure 1:
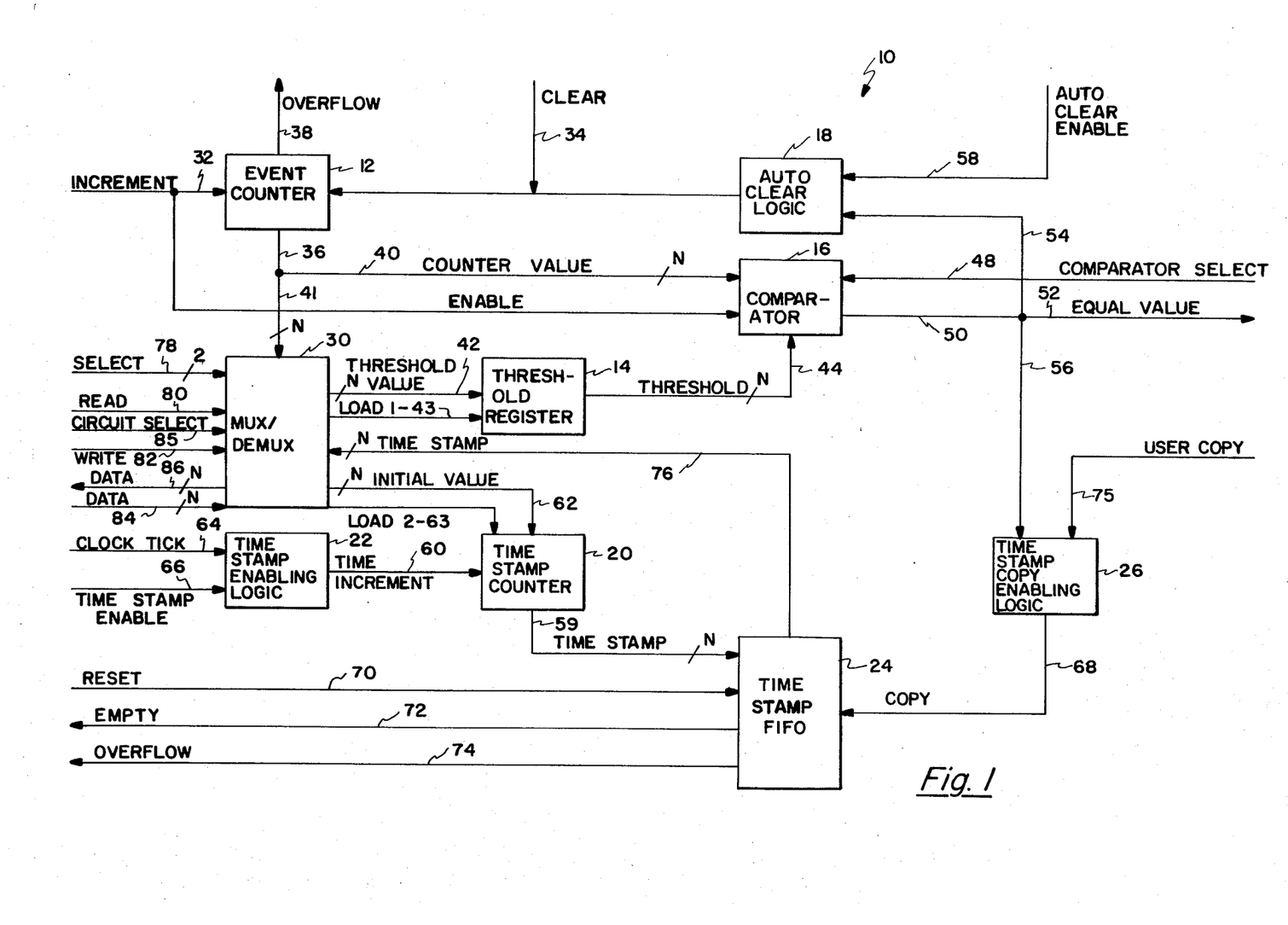
FIG. 1 is a block diagram of the present invention.

Monitor circuit 10 includes several digital electrical subcircuits. These subcircuits are event counter 12, threshold register 14, comparator 16, auto clear logic 18, time stamp counter 20, time stamp FIFO 24, time stamp copying enabling logic 26, and multiplexer/demultiplexer 30. The number of bits indicated in the various signals to and from these subcircuits are the preferred bit values only, those skilled in the art will recognize that other bit values are possible and the choice will depend on needs and applications. Signals and their corresponding data paths will be designated by a single numeral unless a signal will travel along more than one data path, in which case additional numerals will be employed. "Continuous" when describing the function of a digital subcircuit will mean functioning at least during every clock pulse. A "P" superimposed on a data path indicates data is transmitted thereupon in parallel.

Event counter 12 is an N bit wide counter which is incremented every occurrence of a particular event class. Monitor circuit 10 has no control over what event classes cause event counter 12 to be incremented. Circuitry or structure external to monitor circuit 10 (and not shown) defines the events to be monitored, and of the possible classes of events, assigns which events will be monitored. Inputs to event counter 12 are a one-bit wide increment signal 32 and a one-bit wide clear signal 34. For the preferred implementation of the present invention logic gates (not shown) within event counter 12 are Schottky diode FET logic (SDFL) gates comprised of GaAs. This facilitates high rate increment signals 32 (i.e., up to 250 MHz). Clear signal 34 causes event counter 12 to set itself to an initial value (preferably zero) and reenables incrementation. Signal 34 comes from outside monitor circuit 10 or from the auto clear logic 18. The latter would occur if the user wants to time stamp every occurrence where event counter 12 has reached a threshold. This is particularly useful when the threshold is set to one, to thus capture every instance of an event class.

The outputs of event counter 12 are an N bit counter value 36 and a one-bit wide overflow signal 38. Counter value signal 36 is used to copy the contents of event counter 12 into comparator 14 by way of data path 40 and/or pass counter value signal 36 to multiplexer/demultiplexer 30 for output (if the user requests it) by way of data path 41. Overflow signal 38 tells the user that event counter 12 has overflowed. The user can record overflow signal 38 if so desired.

Threshold register 14 is an N bit wide register which holds the threshold value which the user has decided will cause a signal when the event counter 12 reaches that threshold. The input threshold value 42 to threshold register 14 is an N bit wide signal (from multiplexer/demultiplexer 30). The output 44 is continuous and is the N bit wide value held in the threshold register. The control signal for loading the threshold register 14 is load1 43 from the multiplexer/demultiplexer 30.

Comparator 16 compares the value of the counter value 36 held in event counter 12 with the value of threshold 44 from threshold register 14. The comparison occurs each time event counter 12 is incremented. The inputs to comparator 16 are counter value 36, enable signal 46 (this is preferably the same as increment signal 32), threshold 44 from threshold register 14 and preferably a one-bit wide comparator select signal 48. Comparator select signal 48 gives the user the ability to select when comparisons are to be made between threshold signal 44 and the counter value 36 currently held in event counter 12. The output of comparator 16 is a one-bit wide equal value signal 50 which indicates that the contents of the event counter 12 is equal to the threshold. Equal value signal 50 is routed to the user, auto clear logic 18 and time stamp copy enabling logic 26 by data paths 52, 54 and 56, respectively. Data path 52 can be adapted to activate a display (not shown) to thus indicate the presence of equal value signal 50 to the user.

Auto clear logic 18 signals event counter 12 to set itself to an initial value (preferably zero) after event counter 12 has reached the threshold. In addition to equal value signal 50, auto clear logic 18 has a one-bit wide auto clear enable signal 58 as an input. Auto clear enable signal 58 is a signal set by the user which activates auto clear enable logic 18 so that event counter 12 will reset to an initial value when equal value signal 50 is also input to auto clear logic 18.

Time stamp counter 20 is an N bit wide counter whose value represents the number of clock ticks since the time stamp counter 20 value was most recently established. There are two inputs to time stamp counter 20. First, a one-bit wide time increment signal 60 representing, preferably, a tick of the clock. Signal 60 could, however, represent any event class which the user wishes. The second input is an N bit wide reference time signal 62 to initialize time stamp counter 20. Reference time value 62 can clear time stamp counter 20 to zero or establish a non-zero base to correct for skew from one circuit to another. The sole output from time stamp counter 20 is an N bit wide signal 59 which is the value of the time stamp counter 20 to be copied to time stamp FIFO 24 when time stamp copy enabling logic 26 is enabled. The control signal for loading the time stamp counter 20 is load2 63 from the multiplexer/demultiplexer 30.

Time stamp enabling logic 22 is used to disable time stamp counter 20 during initialization of the subcircuits of monitor circuit 10 when clock tick signals might already be occurring but all subcircuits are not ready to start in synchronism. The inputs to time stamp enabling logic 22 are a one-bit wide clock tick signal 64 that will cause time stamp counter 20 to be incremented when passed through the time stamp enabling logic 22. As with time increment signal 60, clock tick signal 64 is preferably a clock signal but may be any user defined signal. Time stamp enable signal 66 is a one-bit wide signal that allows clock time signal 64 to pass through time stamp enabling logic 22. Once set, time stamp enable signal 66 preferably remains set until the user resets it. The only output from time stamp enabling logic 22 is time increment signal 60.

Time stamp FIFO 24 is a memory where one or more copies of the time stamp signal 59 can be stored until the user reads them. Each entry is an N bit wide value. The number of entries is dependent on user applications. Time stamp FIFO 24 may contain the logic needed to obtain the value of the time stamp counter 20 when the logic is enabled by a copy signal 68 from time stamp copy enabling logic 22. Note, in the chip implementation discussed with regard to FIG. 3 below, time stamp FIFO 24 is simply a register (buffer register 98) and all logic is contained in copy block 96. The inputs to time stamp FIFO 24 are time stamp signal 59, copy signal 68 and a one-bit wide reset signal 70 which causes time stamp FIFO 24 to establish its initial conditions with all entry locations clear and the copy logic (if any) disabled.

The outputs of time stamp FIFO 24 are a one-bit wide empty signal 72 telling the user that time stamp FIFO 24 is empty when an attempt has been made to read from FIFO 24; a one-bit wide overflow signal 74 telling the user that the time stamp FIFO 24 has attempted to read more values than there are empty entry locations in time stamp FIFO 24; and time stamp signal 76, and N bit wide value read from time stamp FIFO 24 when the multiplexer/demultiplexer select signal 78 so indicates. Time stamp signal 76 causes time stamp FIFO 24 to treat the location of time stamp signal 76 in time stamp FIFO 24 as though it were empty and thus available for reuse.

Time stamp copy enabling logic 26 causes time stamp FIFO 24 to read from time stamp counter 20. Inputs are a one-bit wide user copy signal 75 (generated by the user) which causes a reading of time stamp counter 20 on demand, and equal value 50. The output is copy signal 68.

The last subcircuit in monitor circuit 10 is multiplexer/demultiplexer 30 which routes N bit wide value signals into and out of monitor circuit 10. It reduces pinout requirements for the chip version of monitor circuit 10. There are seven inputs to multiplexer/demultiplexer 30: first, a three-bit wide select signal 78 used to define which of four data paths within monitor circuit 10 will be accessed; second, a one-bit wide read signal 80 causing a read operation to occur on the selected data path; third, a one-bit wide write signal 82 causing a write to occur on the selected data path; fourth, an N bit wide data input signal 84 which is data to be written into the selected path; fifth, counter value 36 (entered along data path 40); sixth, a 1 bit wide circuit select signal 85 which tells circuit 10 that inputs being provided are for it rather than another monitor circuit which might be connected to the same input bus (not shown); and, finally, time stamp signal 76. As is known to those skilled in the art, other signals could be routed through the multiplexer/demultiplexer 30 and a control register (not shown). Signals such as comparator select 48, user copy 75, empty 72 could be so routed. Thus the routing in FIG. 1 should be considered one of many options.

The outputs from multiplexer/demultiplexer 30 are an N bit wide data signal 86 that is either from event counter 12 or from time stamp FIFO 24 depending upon the select input signal 78; threshold signal 42 and initial value signal 62. The control signals for loading threshold 14 and time stamp counter 20 are load1 43 and load2 63, respectively.

Figure 2:
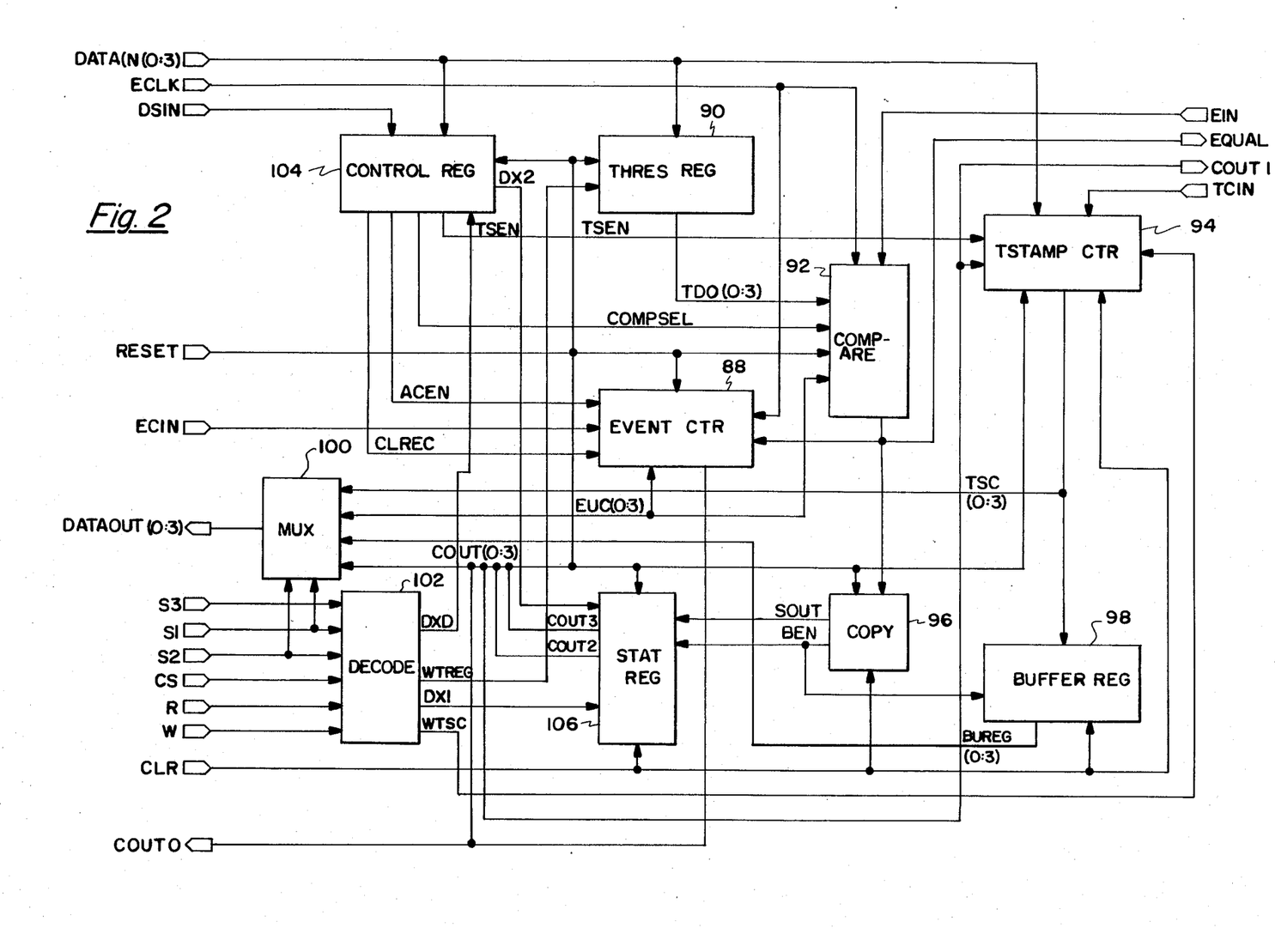
FIG. 2 is a more detailed block diagram of a semiconductor chip implementation of the present invention.

FIG. 2 is a block diagram with signal codes displaying a portion of a semiconductor chip implementation of the present invention. The layout of circuitry related to various functions differs somewhat from FIG. 1 and some additional circuitry for further functions is included. Therein event counter 88, threshold register 90, compare 92 and time stamp counter 94 are functionally equivalent to event counter 12, threshold register 14, comparator 16 and time stamp counter 20, respectively.

Copy block 96 is similar in function to time stamp enabling logic 26 but also performs the function of copying the contents of time stamp counter 94 into a buffer register 98. Buffer register 98 is similar to time stamp FIFO 24 but is simply a register dedicated to the receipt of the contents of time stamp counter 24 at certain times.

Multiplexer 100 in conjunction with decode 102 perform substantially the same function as multiplexer/demultiplexer 30, although now multiplexer 100 and decode 102 work in conjunction with control register 104 to control most of the inputs to monitor 10. Status register 106 is in addition to the blocks of FIG. 1. Status register 106 primarily monitors the condition of buffer register 98 as well as recent conditions therein.

Table 1 below is a chart indicating the blocks of FIG. 2 along with the coded inputs and outputs thereto as well as a brief description of each code's function. A numeral in parenthesis following a coded input indicates that the coded input directly corresponds to the signal of like number described in FIG. 1. Further, parenthetical expressions of the form (0:3) indicate the first and last data bits being transmitted along a data path. The immediately preceding example thus includes data bits 0, 1, 2 and 3.

Figure 3:
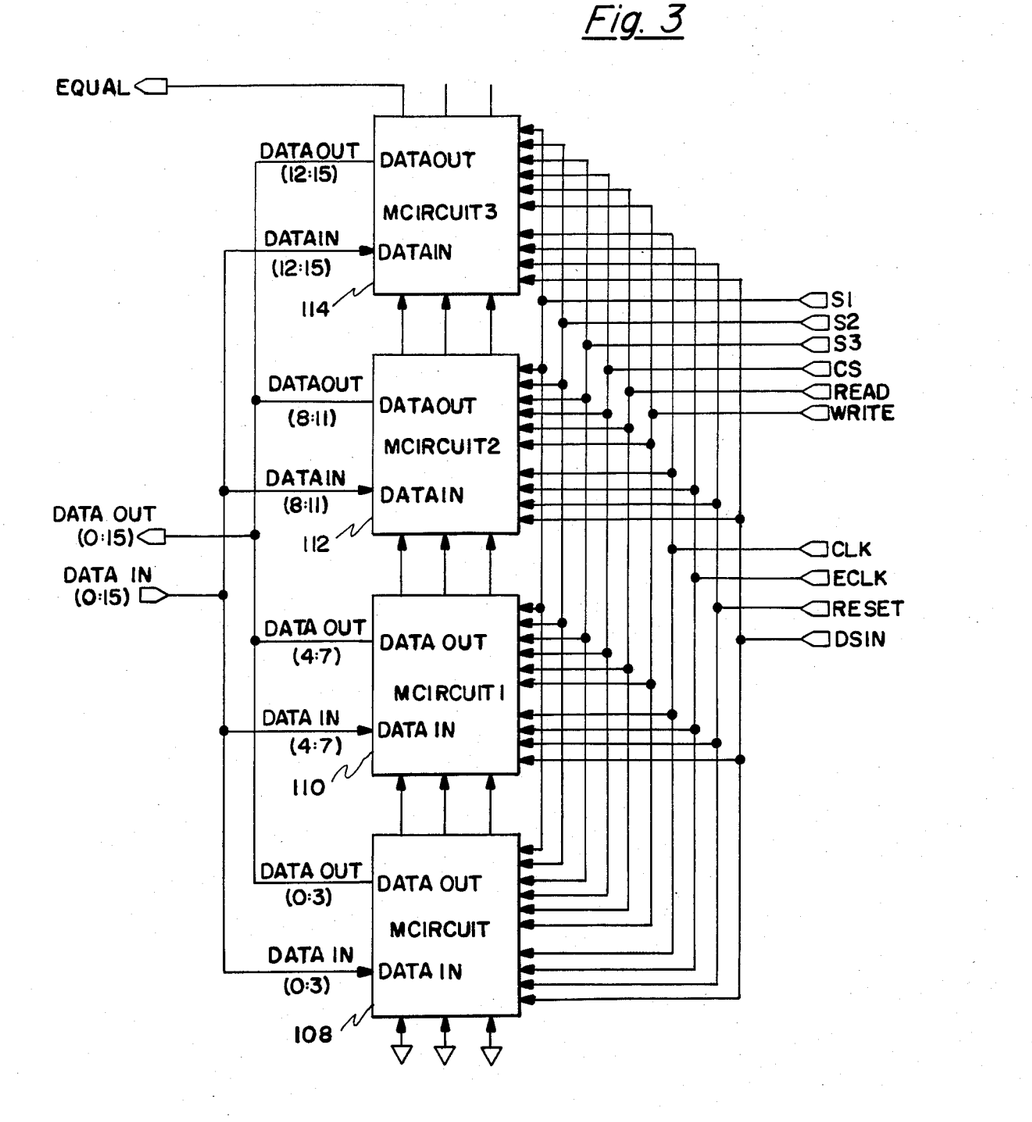
FIG. 3 is a block diagram illustrating several of the devices of FIG. 2 in a cascaded configuration.

FIG. 3 shows four monitor circuits 108, 110, 112 and 114 each being the same as monitor circuit 10 in FIG. 2, cascaded with sixteen bits sliced four bits per circuit. Input signals are shown as common to all four circuits. Those skilled in the art will recognize that the number of bits per circuits as well as the total number of bits can vary depending ion the desired application.

Figure 4:
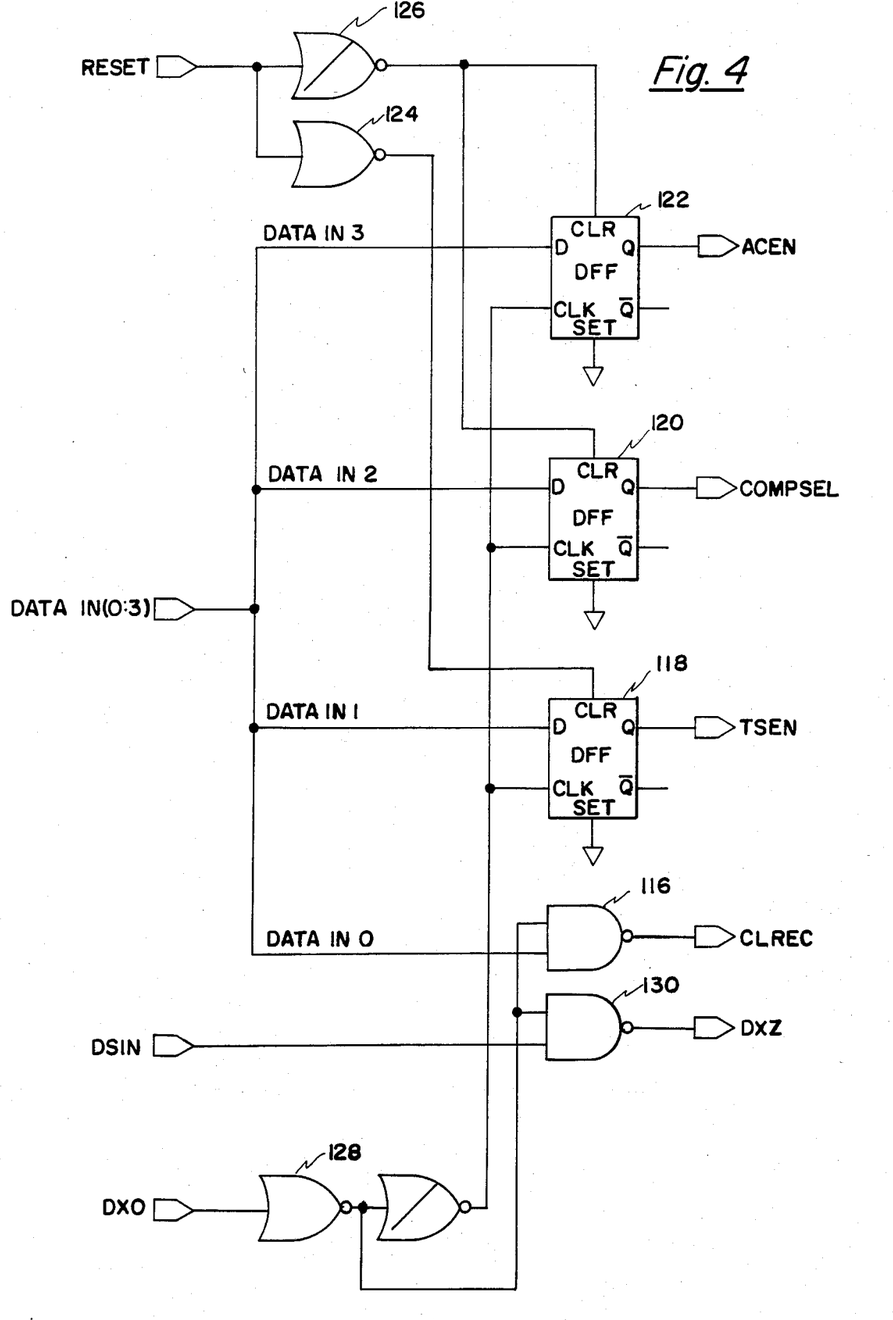
FIG. 4 is an electrical schematic of the control register of FIG. 2.

FIG. 4 is a schematic of control register 104. Four bits of data (for example) are loaded in parallel into NAND gate 116 and three D flip flops 118, 120 and 122. All D flip flops within circuit 10 are preferably based on NOR gates and the logic examples discussed below presume that they are so configured. The function of the auto clear logic 18 in FIG. 1 is performed by control register 104 in FIG. 2 using signals ACEN, CLREC and EQUAL.

The RESET signal is inverted by NOR gates 124 and 126 and input to each of the clears (CLR) of the D flip flops 118, 120 and 122. Note that NOR gate 126 is a buffered NOR gate designed for high fan out. Pulsing RESET high will clear the D flip flops 118, 120 and 122 (i.e., Q=0 when CLK=1). Any DATAIN would not appear at the outputs of the respective flip flops in FIG. 4 until DX0 drops from high to low. At that time the D inputs of the flip flops 118, 120 and 122 will appear at the Q outputs (and the $\overline{Q}$ outputs).

DX0 is inverted only once by buffered NOR gate 128 prior to being input to NAND gate 116. If $\overline{DX0}$ is a high signal, then it will serve to pass $\overline{DATAIN0}$ to the output of NAND gate 116.

DSIN serves as one input to NAND gate 130. The output of which (i.e., DX2) clears signal COUT3 from status register 106.

Figure 5:
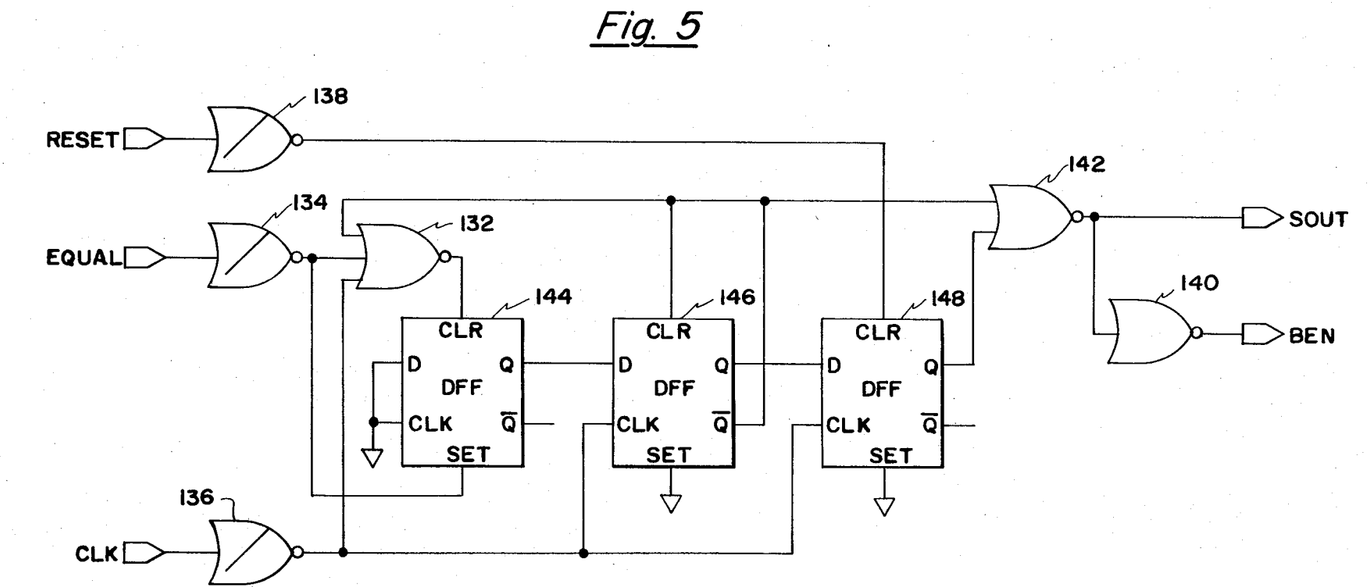
FIG. 5 is an electrical schematic of the copy logic of FIG. 2.

The copy logic of FIG. 5 employs six NOR gates 132, 134, 136, 138, 140 and 142 along with three D flip flops 144, 146 and 148. The function of copy logic 96 is twofold. First, when a high equal signal 50 occurs it places that signal in synchronism with the clock signal. Second, a high equal signal 50 will clear event counter 88 if signal ACEN is activated. Event counter 88 could be cleared so rapidly that it could affect the duration of high equal signal 50. Copy logic 96 therefore insures that the duration of the equal signal pulse 50 corresponds to the duration of other logic signal pulses in monitor circuit 10. D flip flop 144 is configured as an asynchronous flip flop having an output Q which is independent of the D input. When NOR gate 132 is enabled (by having three low inputs) it produces a high output, the output Q of D flip flop 144 goes high. D flip flops 146 and 148 act as delays for the output of D flip flop 144. SOUT goes high whenever a high signal appears at the output of D flip flop 146. When SOUT goes high, NOR gate 140 inverts SOUT and generates a low BEN signal. As indicated above, BEN enables copying of the contents to the time stamp counter 94 into buffer register 98. SOUT controls the output of status register 106.

TABLE 1

| Component | Signals | Description |
|---|---|---|
| Threshold Register 90 | Inputs | |
| | DATAIN(0:3)(42) | Threshold value |
| | RESET | Clears all counters, initializes all components |
| | WTREG | Writes DATAIN(0:3) into Threshold Register |
| | Outputs | |
| | TDO(0:3) (44) | Threshold value |
| Compare 92 | Inputs | |
| | COMPSEL | Enables comparison of Threshold and Event Counter |
| | ECLK | Tells Event Counter and Compare that a data bit is on the ECIN |
| | EIN | Previous chip in a cascaded set has generated an EQUAL signal |
| | EVC(0:3) (36) | Current value of the Event Counter |
| | RESET | Clears all counters, initializes all components |
| | TDO(0:3) (44) | Threshold value |
| | Output | |
| | EQUAL | Signals that Compare has found equality, becomes EIN for other cascaded chips |
| EventCtr 88 | Inputs | |
| | RESET | Clears all counters, initializes all components |
| | ACEN | Enables automatic clearing |

TABLE 1-continued

| Component | Signals | Description |
|---|---|---|
| | | of event counter |
| | CLREC | Clears Event Counter, user controlled |
| | ECIN (32) | Signal to increment Event Counter |
| | ECLK | Signals that a data bit is on line ECIN |
| | EQUAL | Signals that Compare has found equality, clears Event Counter if ACEN enabled by user |
| | Output | |
| | EVC(0:3) (36) | |
| | COUT 0 (38) | Event Counter overflow signal |
| Time Stamp Ctr 94 | Inputs | |
| | DATAIN(0:3)(62) | Initial value of Time Stamp Counter |
| | CLK | A synch signal for components needing same |
| | RESET (70) | Clears all counters, initializes components |
| | TCIN (60) | Signal to increment Time Stamp Counter |
| | TSEN (66) | Enables time stamping |
| | WTSC | Enables writing of DATAIN(0:3) into Time Stamp Counter |
| | Outputs | |
| | TSC(0:3)(59) | Current Time Stamp Counter value |
| | COUT 1 | Time Stamp Counter overflow signal |
| Copy 96 | Inputs | |
| | CLK | Synch signal for components needing same |
| | EQUAL (50) | Signals that Compare has found equality |
| | RESET | Initializes and clears copy logic |
| | Output | |
| | SOUT | Sets COUT2 and COUT3 |
| | BEN (68) | Enables copying of Time Stamp Counter into Buffer Register |
| Buffer Register 98 | Inputs | |
| | BEN (68) | Enables copying of Time Stamp Counter into Buffer Register |
| | TSC(0:3)(59) | Current Time Stamp Counter value |
| | CLK | Synch signal |
| | Output | |
| | BUREG(0:3)(76) | Time Stamp Counter value when EQUAL generated |
| Mux 100 | Inputs | |
| | BUREG(0:3)(76) | Time Stamp Counter value when EQUAL generated |
| | COUT 0 | Event Counter overflow signal |
| | COUT 1 | Time Stamp Counter overflow signal |
| | COUT 2 | Signal that new data has been written into Buffer Register |
| | COUT 3 | Signal that Buffer data was written over before it was read |
| | EVC(0:3)(36) | Current value of the Event Counter |
| | TSC(0:3)(59) | Current Time Stamp Counter value |
| | Output | |
| | DATAOUT(0:3)(86) | Four bits of data provided to user when a read request comes in for the Event Counter(i.e.,EVC(0:3)), the Buffer Register(i.e.,BUREG(0:3)) or the Status Register(i.e.,COUT(0:3)). |
| DECODE 102 | Inputs | |
| | S1,S2,S3 (78) | Three bits allowing selection of single component |
| | CS | Circuit select signal |
| | R (80) | Read access signal |
| | W (82) | Write access signal |
| | Outputs | |
| | DX0 | Enables writing of DATAIN (0:3) into Control Register |
| | DX1 | Enables writing of Status Register in Mux |
| | WTREG | Enables writing of DATAIN (0:3) into Threshold Register |
| | WTSC | Enables writing of DATAIN (0:3) into Time Stamp Counter |
| ControlReg104 | Inputs | |
| | DATAIN(0:3) | ACEN,COMPSEL,TSEN and CLREC signals |
| | DSIN | Controls DX2 |
| | DX0 | Enables writing of DATAIN(0:3) into Control Register |
| | RESET | Clears all counters, initializes all components |

TABLE 1-continued

| Component | Signals | Description |
| --- | --- | --- |
| | Outputs | |
| | ACEN | Enables event counting |
| | CLREC | Clears Event Counter |
| | COMPSEL | Enables comparison of Threshold and Event Counter |
| | DX2 | Clears COUT3 |
| | TSEN (66) | Enables event counting |
| Status Register 106 | Input | |
| | BEN (68) | Enables copying of Time Stamp Counter into Buffer Register |
| | CLK | Synch for components needing same |
| | DX1 | Enables writing of Status Register in Mux |
| | DX2 | Clears COUT3 |
| | RESET | Clears all counters, initializes all components |
| | SOUT | Sets COUT2 and COUT3 |
| | Outputs | |
| | COUT 2 | Signal that new data has been written into Buffer Register |
| | COUT 3 | Signal that Buffer data was written over before it was read. |

What is claimed is:

1. An electrical device for monitoring a monitored device, wherein the occurrence of selected events in said monitored device generates event digital signals and wherein a control device generates digital clock signals, comprising:
   first means for counting said event digital signals so that the current value of said first counting means is an event count;
   means for selectively altering a threshold value;
   means for storing said threshold value;
   means for comparing said stored threshold value to said event count and for generating an equal value digital signal when said event count equals said threshold value;
   second means for counting said digital clock signals so that the current count of said second counting means corresponds to a time interval;
   means for setting said second counting means to a predetermined value when said first counting means is at an initial value;
   means for recording said current count of said digital clock signals in response to a record signal;
   means for resetting said event count to said initial value upon the occurrence of said record signal; and
   means for storing a plurality of said current counts of said digital clock signals, one of said current counts of said digital clock signals being stored each time said record signal occurs.

2. The device of claim 1 wherein said record signal is said equal value digital signal.

3. The device of claim 1 wherein said predetermined value and said reference value are each zero.

4. The device of claim 1 further including:
   means for reading selected portions of the contents of said means for storing a plurality of said current counts;
   means for selectively enabling said comparing means;
   means for selectively enabling said resetting means; and
   means for selectively enabling (22) said second counting means (20).

* * * * *

UNITED STATES PATENT AND TRADEMARK OFFICE
CERTIFICATE OF CORRECTION

PATENT NO. : 4,636,967
DATED : JANUARY 13, 1987
INVENTOR(S) : D. BHATT, ET AL.

It is certified that error appears in the above-identified patent and that said Letters Patent is hereby corrected as shown below:

Column 10: in line 35, delete "reference" and insert in lieu thereof --initial--; in line 43, delete "(22)"; and in line 44, delete "(20)".

Signed and Sealed this

Sixth Day of October, 1987

Attest:

Attesting Officer

DONALD J. QUIGG

Commissioner of Patents and Trademarks